(12) United States Patent
Underwood et al.

(10) Patent No.: US 9,769,900 B2
(45) Date of Patent: Sep. 19, 2017

(54) LIGHTING FIXTURE WITH IMAGE SENSOR MODULE

(71) Applicant: Cree, Inc., Durham, NC (US)

(72) Inventors: Robert D. Underwood, Santa Barbara, CA (US); John Roberts, Durham, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/928,592

(22) Filed: Oct. 30, 2015

(65) Prior Publication Data

US 2017/0127492 A1     May 4, 2017

(51) Int. Cl.
H05B 37/02     (2006.01)
H05B 33/08     (2006.01)

(52) U.S. Cl.
CPC ..... *H05B 33/0854* (2013.01); *H05B 37/0218* (2013.01); *H05B 37/0227* (2013.01)

(58) Field of Classification Search
CPC .............. H05B 37/0218; H05B 37/022; H05B 37/0272; H05B 33/0854
See application file for complete search history.

(56) References Cited

U.S. PATENT DOCUMENTS

| 8,779,667 | B2 | 7/2014 | Nanahara et al. | |
|---|---|---|---|---|
| 9,155,165 | B2 | 10/2015 | Chobot | |
| 2003/0174235 | A1* | 9/2003 | Barkan | H04N 5/217 348/362 |
| 2011/0013845 | A1* | 1/2011 | Tu | G06K 9/00288 382/218 |
| 2011/0115910 | A1 | 5/2011 | Brackney | |
| 2012/0319596 | A1* | 12/2012 | Nanahara | H05B 37/0227 315/153 |
| 2012/0320262 | A1 | 12/2012 | Chung | |
| 2013/0002157 | A1* | 1/2013 | van de Ven | H05B 33/0824 315/192 |
| 2013/0113956 | A1* | 5/2013 | Anderson | G06F 3/017 348/223.1 |

(Continued)

FOREIGN PATENT DOCUMENTS

| WO | 20080012715 A2 | 1/2008 |
|---|---|---|
| WO | 20100125483 A2 | 11/2010 |

(Continued)

OTHER PUBLICATIONS

Author Unknown, "Image Processing Occupancy Sensor (IPOS)," National Renewable Energy Laboratory (NREL), techportal.eere.energy.gov/techpdfs/IPOS%201-pager%20promo%20v2.pdf, 2 pages.

(Continued)

*Primary Examiner* — Tung X Le
*Assistant Examiner* — Raymond R Chai
(74) *Attorney, Agent, or Firm* — Withrow & Terranova, P.L.L.C.

(57) ABSTRACT

A lighting fixture includes a control system, a light source, and an image sensor module. The image sensor module is configured to capture image data and process the image data to provide derived image data, such that the derived image data is downsampled from the image data. The derived image data is used by the control system to adjust one or more characteristics of light provided by the light source.

9 Claims, 21 Drawing Sheets

(56) References Cited

U.S. PATENT DOCUMENTS

| | | | | |
|---|---|---|---|---|
| 2014/0072211 A1* | 3/2014 | Kovesi | ............... | G06T 7/90 |
| | | | | 382/164 |
| 2015/0305119 A1* | 10/2015 | Hidaka | ............ | H05B 37/0218 |
| | | | | 315/153 |
| 2016/0088712 A1* | 3/2016 | Kim | ............... | H05B 37/0218 |
| | | | | 315/149 |
| 2016/0128161 A1* | 5/2016 | Nakamura | ......... | H05B 37/0218 |
| | | | | 315/155 |

FOREIGN PATENT DOCUMENTS

| | | |
|---|---|---|
| WO | 20110004289 A1 | 1/2011 |
| WO | 20110086501 A1 | 7/2011 |

OTHER PUBLICATIONS

Author Unknown, "Image Processing Occupancy Sensor (IPOS)," Technology Available for Licensing (abstract), National Renewable Energy Laboratory (NREL), 2 pages.

Brackney, Larry, J., et al., "Design and Performance of an Image Processing Occupancy Sensor," Proceedings of the Second International Conference on Building Energy and Environment, Topic 10: Intelligent buildings and advanced control techniques, (2012) pp. 987-994.

Polese, Luigi, Gentile, et al., "Image Processing Occupancy Sensor (IPOS) Enhanced Prototype Experiment Design and Test Plan," Internal Deliverable Prepared for Bonneville Power Administration, Version 1, Mar. 2012, National Renewable Energy Laboratory, Golden, Colorado, 46 pages.

Sarkar, Abhijit, et al., "Integrated Daylight Harvesting and Occupancy Detection Using Digital Imaging," Proceedings of the SPIE Sensors, Cameras, and Systems for Industrial/Scientific Applications IX, vol. 6816, Feb. 2008, SPIE, pp. 68160F-1 to 68160F-12.

Scanlon, Bill, "NREL Adds Eyes, Brains to Occupancy Detection," National Renewable Energy Laboratory, Jun. 4, 2013, http://www.nrel.gov/news/features/feature_detail.cfm/feature_id=2210?print, Alliance for Sustainable Energy, LLC, 3 pages.

Invitation to Pay Additional Fees and Partial International Search for International Patent Application No. PCT/US2016/058493, mailed Feb. 14, 2017, 7 pages.

International Search Report for International Patent Application No. PCT/US2016/058493, dated Apr. 18, 2017, 19 pages.

* cited by examiner

LIGHTING FIXTURE WITH IMAGE SENSOR MODULE

FIELD OF THE DISCLOSURE

The present disclosure relates to lighting fixtures, and in particular to lighting fixtures with an image sensor.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based light fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include special control circuitry to provide uniquely configured signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light, occupancy, temperature, and the like.

SUMMARY

The present disclosure relates to lighting fixtures, and in particular to lighting fixtures with an image sensor. In one embodiment, a lighting fixture includes a control system, a light source, and an image sensor module. The image sensor module is configured to capture image data and process the image data to provide derived image data, such that the derived image data is downsampled from the image data. The derived image data is used by the control system to adjust one or more characteristics of light provided by the light source. By using the derived image data to adjust one or more characteristics of the light provided by the light source, the amount of data transferred between the image sensor module and the control system is reduced, which may reduce the performance requirements of a bus connecting the control system and the image sensor module. Further, using the derived image data allows the control system to process less data, thereby reducing the performance requirements of the control system itself and thereby potentially reducing the cost of the lighting fixture.

In one embodiment, the derived image data is used to determine an ambient light level in an area surrounding the lighting fixture. In particular, a mean light intensity for a number of zones (i.e., a zoned mean light intensity) within a frame (or a number of frames) of the image data may be obtained from the image sensor module and used to determine the ambient light level. The mean light intensity for each one of the zones may be averaged to determine an ambient light level. In one embodiment, zones within the frame of image data for which the mean light intensity is a predetermined threshold above the mean light intensity for one or more other zones may be ignored (not included in the average) to increase the accuracy of the determined ambient light level. The mean light intensity may be a luminance or a luma value.

In one embodiment, the derived image data is used to determine an occupancy event within the area surrounding the lighting fixture. In particular, a mean light intensity for a number of zones within the image data may be obtained from the image sensor module and used to determine whether an occupancy event has occurred. A weighted running average for the mean light intensity in each zone may be maintained, and deviations of an instantaneous measure of the mean light intensity from the weighted running average within a particular zone that are above a predetermined threshold may indicate an occupancy event. In one embodiment, deviations of the mean light intensity from the weighted running average that are above the predetermined threshold occurring simultaneously in a supermajority of the zones may be ignored in order to decrease the likelihood of false positives in the occupancy detection. Further, the difference between the weighted running average and the zoned mean light intensity for each zone may be normalized for different light levels to increase the accuracy of occupancy detection. Finally, a Gaussian mixture model may be applied to the derived image data and used to determine an occupancy event in order to increase the accuracy of occupancy detection.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
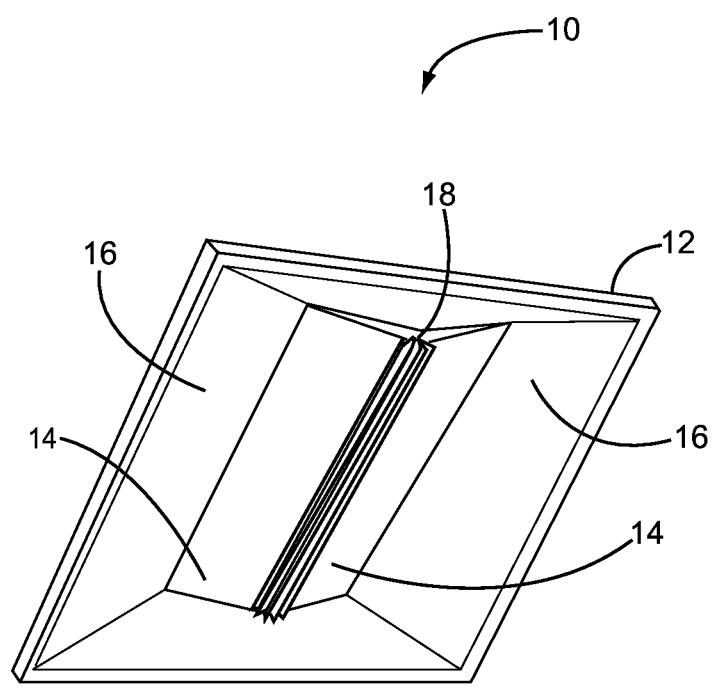
FIG. 1 is a perspective view of a lighting fixture according to one embodiment of the disclosure.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

In general, a lighting fixture with a control system, a light source, and an image sensor module is disclosed. The image sensor module is configured to capture one or more images, and process the one or more images to provide derived image data, which is downsampled from the one or more images. As defined herein, derived image data is data representative of one or more characteristics of an image that is downsampled from raw image data taken from an image sensor. In some embodiments, the derived image data is zoned mean light intensity data, which is defined herein as a mean light intensity value for each one of a number of zones in an image frame. The light source provides light in response to one or more drive signals. The control system provides the one or more drive signals to control the light emitted by the light source. In particular, the control system provides the one or more drive signals based on the derived image data, which may indicate an ambient light level of an area surrounding the lighting fixture or an occupancy event detected in the area surrounding the lighting fixture. By using the derived image data (rather than the images and/or raw image data) to provide the drive signal, the amount of data transferred between the image sensor module and the control system is reduced, which may reduce the performance requirements of a bus connecting the control system and the image sensor module. Further, using the derived image data allows the control system to process less data, thereby reducing the performance requirements of the control system itself and thereby potentially reducing the cost of the lighting fixture.

The image sensor module may further be used to monitor for modulated light signals from one or more additional lighting fixtures. As defined herein, a modulated light signal is a light signal that is modulated specifically for the purpose of conveying information. The intensity, color, vividness, or any other desired characteristic of the light may be modulated to convey the information. Notably, the information may simply be a desired modulation pattern that identifies that the lighting fixture is operating in a certain mode, for example, to facilitate detection of the lighting fixture as discussed below. Upon detection of a modulated light signal, the control system may determine an intensity of the modulated light signal (or a steady-state light signal delivered from the same additional lighting fixture) and a direction from which the modulated light signal is being received. By determining both an intensity and a direction of light emitted from the additional lighting fixture, the relative location of the additional lighting fixture may be determined. Further, the lighting fixture may be able to accurately determine if the additional lighting fixture should be grouped with the lighting fixture such that the lighting fixture and the additional lighting fixture should be controlled together.

Prior to discussing the details of the present disclosure, an overview of an exemplary lighting fixture is provided. While the concepts of the present disclosure may be employed in any type of lighting system, the following description describes these concepts in a troffer-type lighting fixture, such as the lighting fixture 10 illustrated in FIGS. 1-3. This particular lighting fixture is substantially similar to the CR and CS series of troffer-type lighting fixtures that are manufactured by Cree, Inc. of Durham, N.C.

While the disclosed lighting fixture 10 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Further, the functionality and control techniques described below may be used to control different types of lighting fixtures, as well as different groups of the same or different types of lighting fixtures at the same time.

Figure 2:
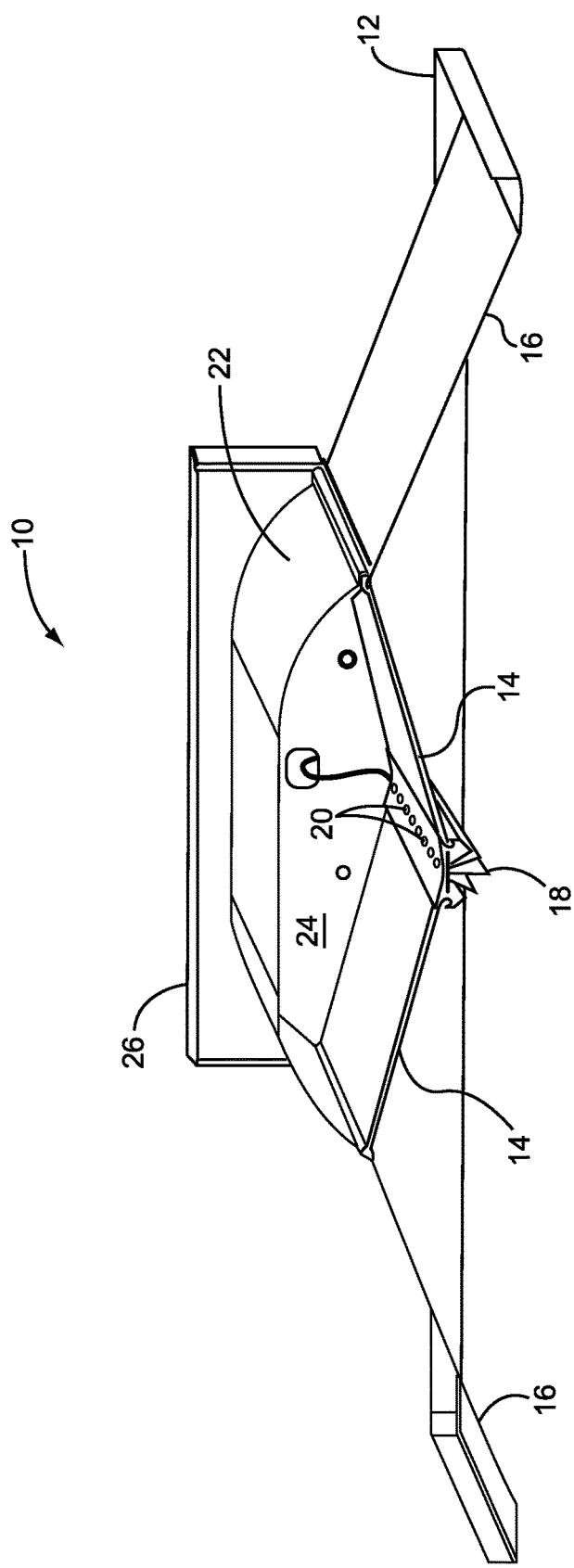
FIG. 2 is a cross-section of a lighting fixture according to one embodiment of the present disclosure.
Figure 3:
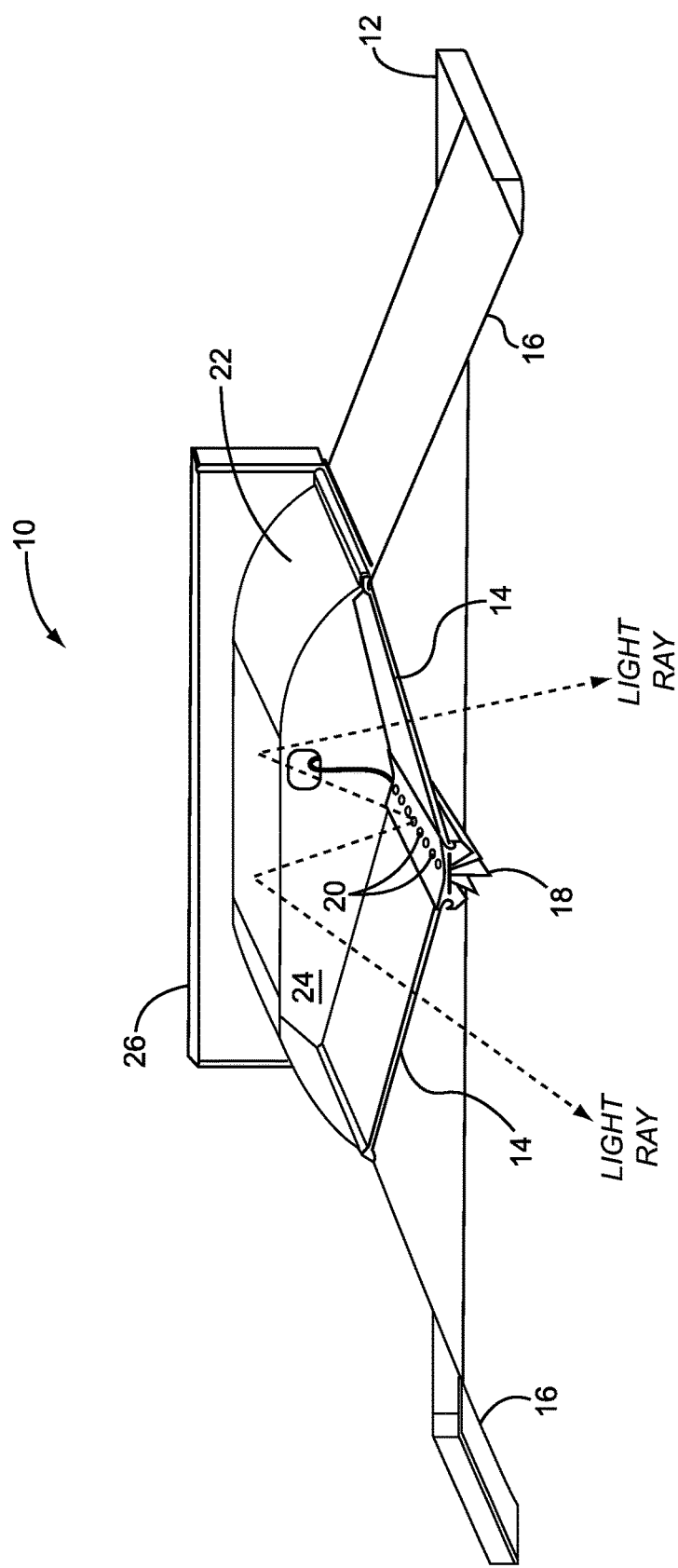
FIG. 3 is a cross-section of a lighting fixture according to an additional embodiment of the present disclosure.

In general, troffer-type lighting fixtures, such as the lighting fixture 10, are designed to mount in, on, or from a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heatsink 18, which functions to join the two inside edges of the lenses 14.

Turning now to FIGS. 2 and 3 in particular, the back side of the heatsink 18 provides a mounting structure for a solid-state light source, such as an LED array 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards from the LEDs of the LED array 20 toward the cover 22 and will be reflected downward through the respective lenses 14, as illustrated in FIG. 3. Notably, not all light rays emitted from the LEDs will reflect directly off the bottom of the cover 22 and back through a particular lens 14 with a single reflection. Many of the light rays will bounce around within the mixing chamber 24 and effectively mix with other light rays, such that a desirably uniform light is emitted through the respective lenses 14.

Those skilled in the art will recognize that the type of lenses 14, the type of LEDs, the shape of the cover 22, and any coating on the bottom side of the cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired characteristic, such as spectral content (color or color temperature), color rendering index (CRI), output level, and the like based on the design parameters for the particular embodiment, environmental conditions, or the like.

As is apparent from FIGS. 2 and 3, the elongated fins of the heatsink 18 may be visible from the bottom of the lighting fixture 10. Placing the LEDs of the LED array 20 in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable.

With continued reference to FIGS. 2 and 3, an electronics housing 26 is shown mounted at one end of the lighting fixture 10, and is used to house all or a portion of a control system (not shown) used to control the LED array 20 and interface with various sensors, such as an image sensor.

Figure 4:
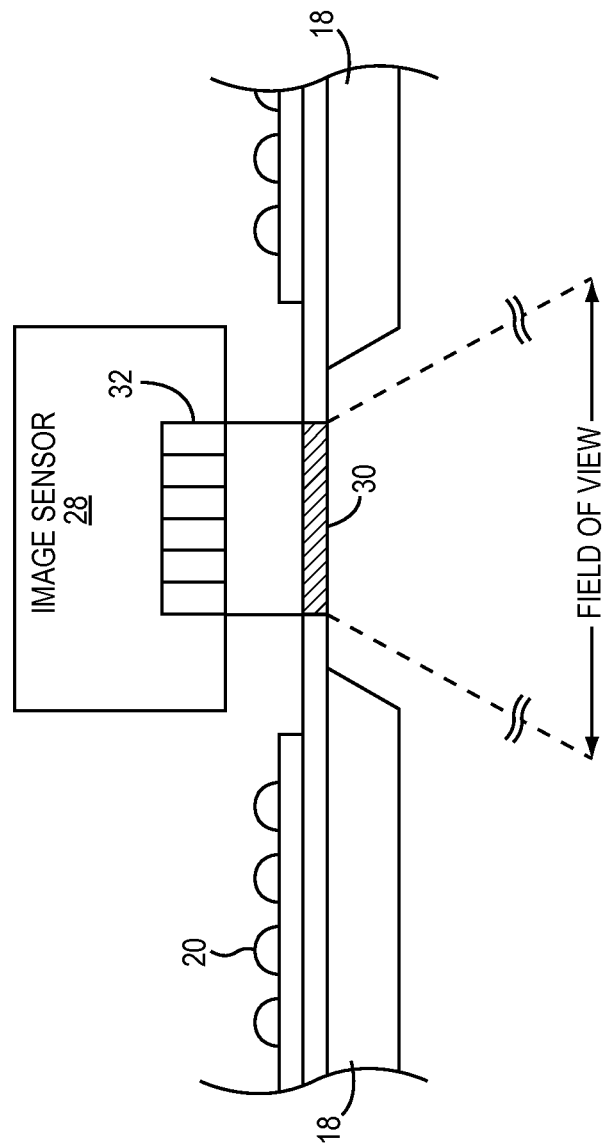
FIG. 4 illustrates an image sensor installed in a heatsink of a lighting fixture according to one embodiment of the disclosure.

FIG. 4 shows an image sensor 28 integrated into the lighting fixture 10 according to one embodiment of the present disclosure. The image sensor 28 may be a CCD (charge-coupled device), CMOS (complementary metal-oxide semiconductor), or any other type of image sensor.

The image sensor 28 is oriented in the lighting fixture 10 and may be configured to capture a field of view that roughly corresponds (at least) to an area that is illuminated by light emitted from the lighting fixture 10. In particular, the image sensor 28 is shown mounted to the back (top) side of the heatsink 18 along with the LED array 20. A lens 30 or opening is provided in the heatsink 18 such that the front surface of the lens 30 is flush with the front surface of the heatsink 18. A pixel array 32 of the image sensor 28 is aligned with the lens 30 such that the pixel array 32 is exposed to a field of view through the lens 30 in the heatsink 18. As illustrated, a portion of the heatsink 18 is contoured to accommodate the lens 30 and ensure that the field of view is not obstructed. Notably, the image sensor 28 need not be mounted to the heatsink 18. The image sensor 28 may be mounted on any part of the lighting fixture 10 that affords the pixel array 32 access to an appropriate field of view. Further, while a simple single-element lens is shown, any number of different lenses, including multiple-element lenses, may be used without departing from the principles of the present disclosure.

Figure 5:
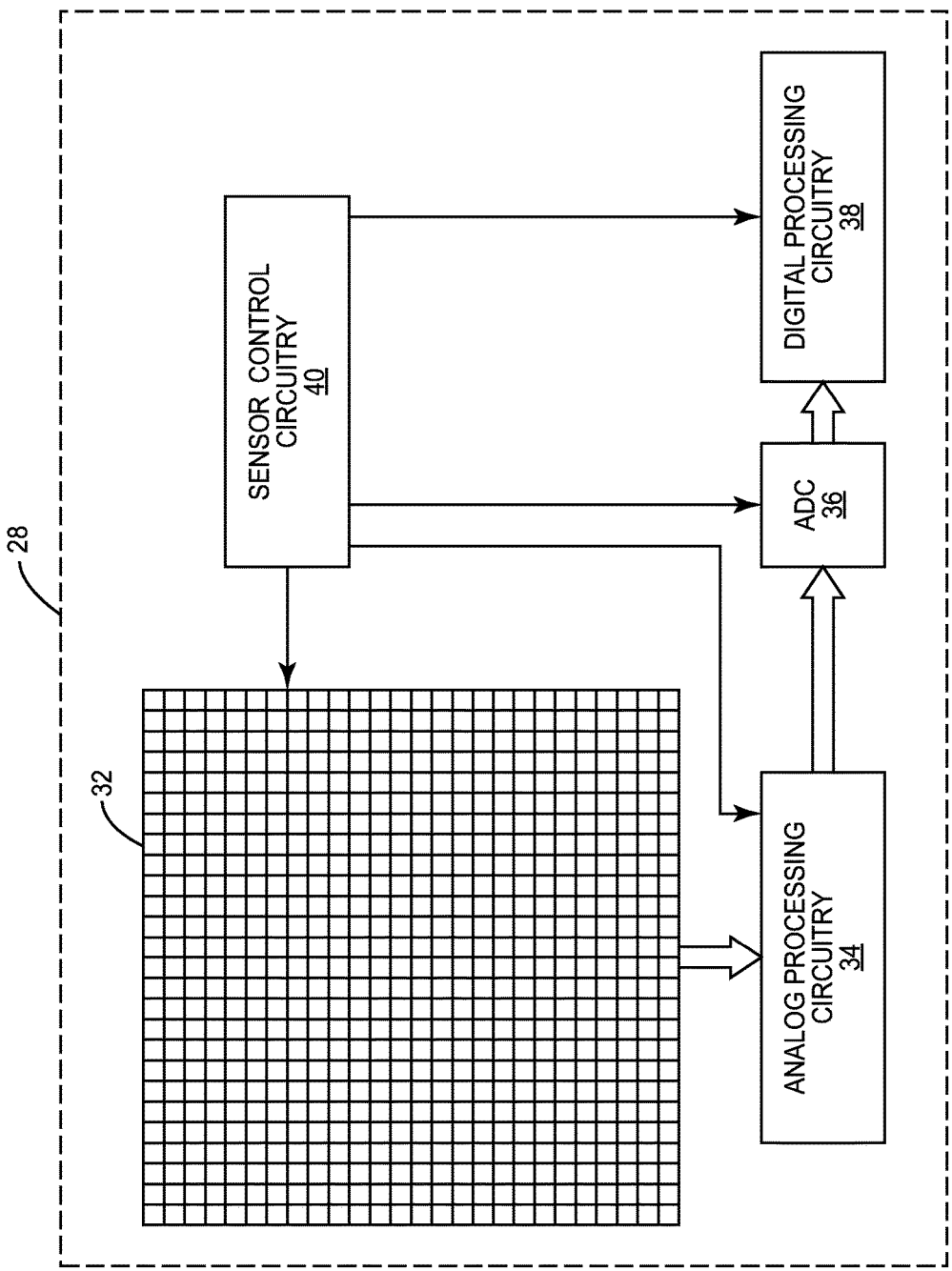
FIG. 5 illustrates details of an image sensor according to one embodiment of the present disclosure.

Details of an exemplary CMOS-based image sensor 28 are shown in FIG. 5. While a CMOS-based image sensor 28 is illustrated, those skilled in the art will appreciate that other types of image sensors 28, such as CCD-based sensors, may be employed. CMOS-based image sensors 28 are particularly useful in lighting applications because they have a broad spectral sensitivity that overlaps that of the human eye. The spectral sensitivity of the human eye is relatively narrow and centered around 560 nm. The spectral sensitivity of CMOS-based image sensors 28 is much broader, yet substantially overlaps that of the human eye and extends toward the red and infrared (IR) end of the spectrum. The spectral sensitivity of the CCD-based image sensor 28 is relatively broad, but does not overlap that of the human eye as well as its CMOS counterpart.

The image sensor 28 generally includes the pixel array 32, analog processing circuitry 34, an analog-to-digital converter (ADC) 36, digital processing circuitry 38, and sensor control circuitry 40. In operation, the pixel array 32 will receive an instruction to capture an image from the sensor control circuitry 40. In response, the pixel array 32 will transform the light that is detected at each pixel into an analog signal and pass the analog signals for each pixel of the pixel array 32 to the analog processing circuitry 34. The analog processing circuitry 34 will filter and amplify the analog signals to create amplified signals, which are converted to digital signals by the ADC 36. The digital signals are processed by the digital processing circuitry 38 to create image data corresponding with the captured image.

The sensor control circuitry 40 will cause the pixel array 32 to capture an image in response to an instruction, for example, from a control system. The sensor control circuitry 40 controls the timing of the image processing provided by the analog processing circuitry 34, the ADC 36, and the digital processing circuitry 38. The sensor control circuitry 40 also sets the image sensor's processing parameters, such as the gain and nature of filtering provided by the analog processing circuitry 34 as well as the type of image processing provided by the digital processing circuitry 38. These settings may be controlled by image processing circuitry (not shown) included in an image sensor module (not shown) along with the image sensor 28 as discussed below.

Figure 6:
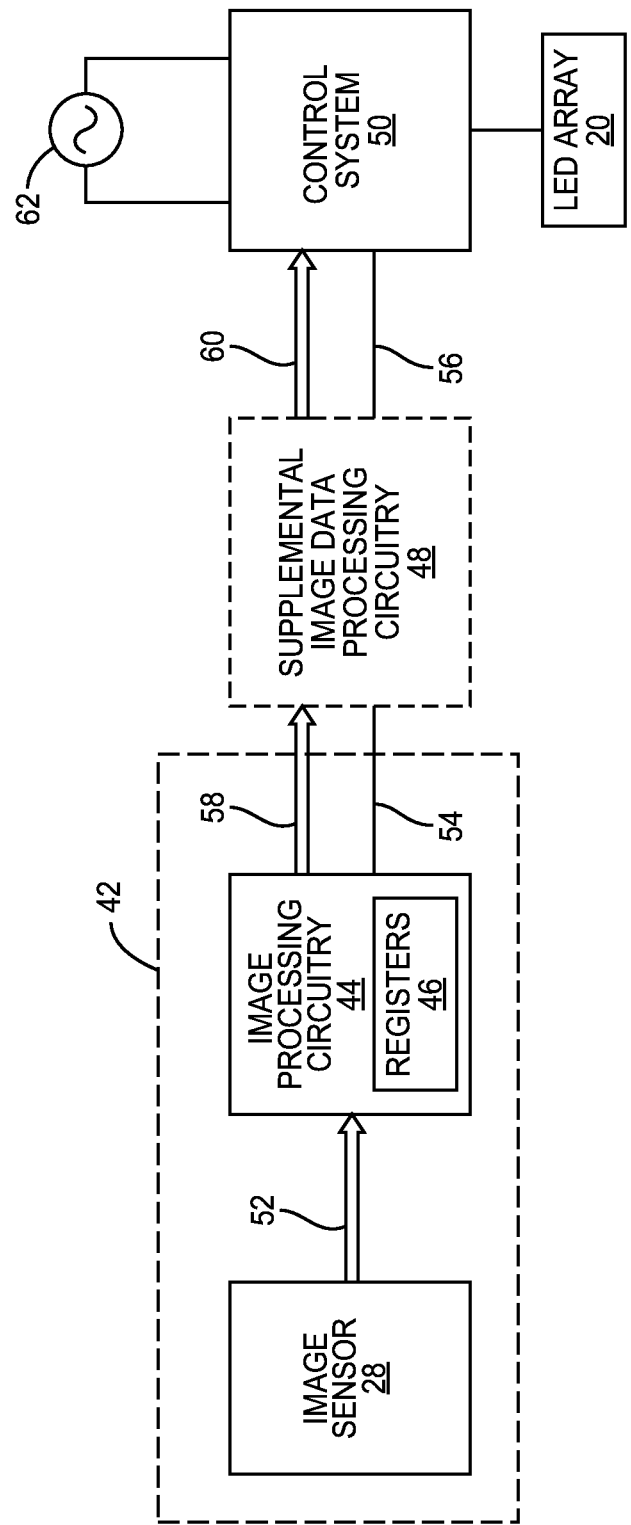
FIG. 6 is a block diagram illustrating electronic components of a lighting fixture according to one embodiment of the present disclosure.

FIG. 6 shows an electrical block diagram of the lighting fixture 10 according to one embodiment of the present disclosure. The lighting fixture 10 includes an image sensor module 42 including the image sensor 28 and image processing circuitry 44, which in turn includes a number of registers 46, optional supplemental image data processing circuitry 48, a control system 50, and the LED array 20. The image sensor module 42 may be a system-on-chip (SoC) in which the image sensor 28 and the image processing circuitry 44 are integrated on a single chip. The supplemental image data processing circuitry 48 may be provided either together or separately from the image sensor module 42. The supplemental image data processing circuitry 48 may be used to offload computations related to image data and/or derived image data that cannot be processed by the image processing circuitry 44 in the image sensor module 42 from the control system 50. Accordingly, using the supplemental image data processing circuitry 48 may reduce the computational load of the control system 50. In some situations, this may improve the performance of the control system 50, or may reduce the required processing power of the control system 50. Reducing the required processing power of the control system 50 may allow for the use of a cheaper and/or more efficient control system 50. Such a benefit may generally be weighed against the added cost, area consumption, and energy consumption of the supplemental image data processing circuitry 48.

In operation, the image sensor 28 is configured to capture images as described above. The image data from these images is sent to the image processing circuitry 44 via a first high-speed bus 52. The image processing circuitry 44 may perform a number of operations on the image data, including filtering and adjusting the image data. Further, the image processing circuitry 44 may determine derived image data from the image data. In general, the derived image data is a downsampled form of the image data. In one embodiment, the derived image data is zoned mean light intensity data, which is defined herein as the mean light intensity for a number of different zones in a frame of the image data. In various embodiments, the mean light intensity may be a mean luminance or a mean luma value. This derived image data is generally written to the registers 46 of the image processing circuitry 44. The derived data may be provided in the normal course of operation of the image sensor module 42, for example, as part of an autoexposure process that is run by the image processing circuitry 44. Accordingly, obtaining the derived image data comes at little to no computational "cost" from the perspective of the supplemental image data processing circuitry 48 and/or the control system 50. In other words, to obtain the derived image data, the supplemental image data processing circuitry 48 and/or control system 50 need only read the registers 46 of the image processing circuitry 44, and therefore avoid receiving and processing of more complex image data.

The supplemental image data processing circuitry 48 may perform one or more computations on the derived image data to determine an ambient light level and/or an occupancy event. However, as discussed above, these computations may also be performed directly by the control system 50. Using the derived image data may allow the supplemental image data processing circuitry 48 to use a first low-speed bus 54 to communicate with the image processing circuitry 44. Similarly, it may also enable the control system 50 to communicate via a second low-speed bus 56 with the supplemental image data processing circuitry 48 and/or directly with the image processing circuitry 44. This is due to the fact that the derived image data is downsampled when compared to the actual image data, and therefore can be transferred very quickly when compared to the image data. In situations where the derived image data is insufficient to accurately characterize the area surrounding the lighting fixture 10, the full image data may be transferred from the image processing circuitry 44 to the supplemental image data processing circuitry 48 via a second high-speed bus 58 for further review. The image data may then be processed by the supplemental image data processing circuitry 48 and the necessary data sent via the second low-speed bus 56 to the control system 50, or the full image data may also be sent to the control system 50, either directly from the image processing circuitry 44 via a third high-speed bus 60 or indirectly from the supplemental image data processing circuitry 48 via the third high-speed bus 60.

The first high-speed bus 52, the second high-speed bus 58, and the third high-speed bus 60 may be any number of high-speed busses known in the art. For example, the first high-speed bus 52, the second high-speed bus 58, and the third high-speed bus 60 may be a universal serial bus (USB), a peripheral component interconnect (PCI) bus, an external serial advanced technology attachment (eSATA) bus, or the like. The first low-speed bus 54 and the second low-speed bus 56 may be any number of low-speed busses known in the art. For example, the first low-speed bus 54 and the second low-speed bus 56 may be an RS-232 bus, a serial peripheral interface (SPI) bus, an $I^2C$ bus, or the like.

The control system 50 may use the image data and/or the derived image data to adjust one or more light output characteristics of the LED array 20. For example, the control system 50 may use the image data and/or the derived image data to adjust a color temperature, a light intensity, a color, a vividness, or the like of the light output of the LED array 20. An alternating current (AC) power source 62 may provide power for the control system 50 and the LED array 20.

While the image sensor module 42 is shown attached to the lighting fixture 10 and coupled to the supplemental image data processing circuitry 48 and/or the control system 50, the image sensor module 42 may also be provided remotely therefrom. For example, the image sensor module 42 may further include wireless or wired communication circuitry through which the image sensor module 42 communicates to the control system 50. Accordingly, the image sensor module 42 may be located remotely from the lighting fixture 10, and may be used by a number of lighting fixtures in a given area.

Figure 7:
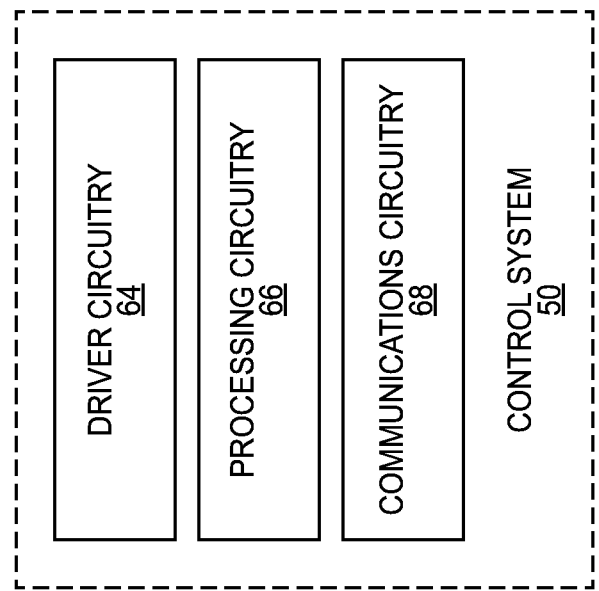
FIG. 7 is a block diagram illustrating details of a control system according to one embodiment of the present disclosure.

FIG. 7 shows details of the control system 50 according to one embodiment of the present disclosure. The control system 50 includes driver circuitry 64, processing circuitry 66, and communications circuitry 68. The driver circuitry 64 may be configured to receive an AC or direct current (DC) input signal and appropriately condition the signal to provide one or more desired drive signals to the LED array 20. The processing circuitry 66 may provide the main intelligence of the lighting fixture 10 and facilitate high-level decision making and information processing. The communications circuitry 68 may include wired communications circuitry and/or wireless communications circuitry configured to communicate with additional lighting fixtures, controllers, and the like. While the driver circuitry 64, the processing circuitry 66, and the communications circuitry 68 are all shown within the single control system 50, the various components may be provided separately as well. Further, the various components may be combined into a single component (e.g., a single package) without departing from the principles of the present disclosure.

Figure 8:
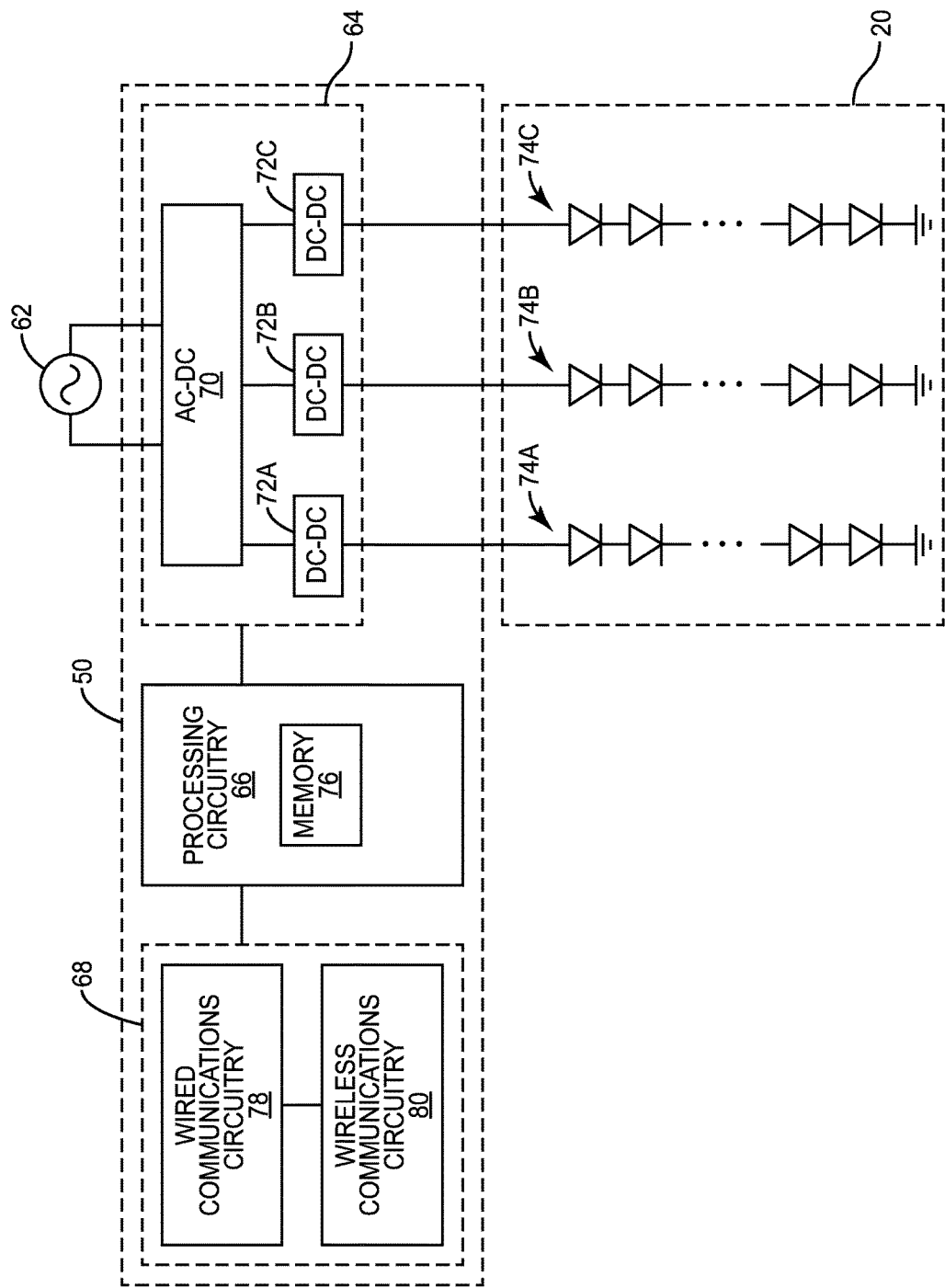
FIG. 8 is a block diagram illustrating details of a control system according to an additional embodiment of the present disclosure.

FIG. 8 shows further details of the control system 50 and the LED array 20 according to one embodiment of the present disclosure. As shown, the driver circuitry 64 includes AC-DC converter circuitry 70 and DC-DC converter circuitry 72. The AC-DC converter circuitry 70 receives an AC input signal from the AC power source 62 and provides a DC signal to the DC-DC converter circuitry 72. Specifically, the AC-DC converter circuitry 70 provides a DC signal to the DC-DC converter circuitry 72 for each one of a number of series-connected LED strings 74 in the LED array 20. As discussed in detail below, the particular LEDs in each one of the series-connected LED strings 74 may provide light with different characteristics. The DC-DC converter circuitry 72 for each one of the series-connected LED strings 74 may control the current provided through the string independently. Accordingly, by providing different currents to different strings, the DC-DC converter circuitry 72 may adjust one or more light output characteristics of the LED array 20. The AC-DC converter circuitry 70 and the DC-DC converter circuitry 72 may be controlled by input signals provided by the processing circuitry 66.

The processing circuitry 66 may include a memory 76, which may store instructions, which, when executed by the processing circuitry 66 implement the core functionality of the lighting fixture 10. In particular, the memory 76 may include instructions for controlling the DC-DC converter circuitry 72 in order to provide light from the LED array 20 with one or more desired characteristics based on inputs from the image sensor module 42. The communications circuitry 68 may include wired communications circuitry 78 and wireless communications circuitry 80. Accordingly, the communications circuitry 68 may enable the lighting fixture 10 to communicate with one or more additional lighting fixtures (not shown), one or more controllers (not shown), or any other devices on a local or remote network.

Figure 9:
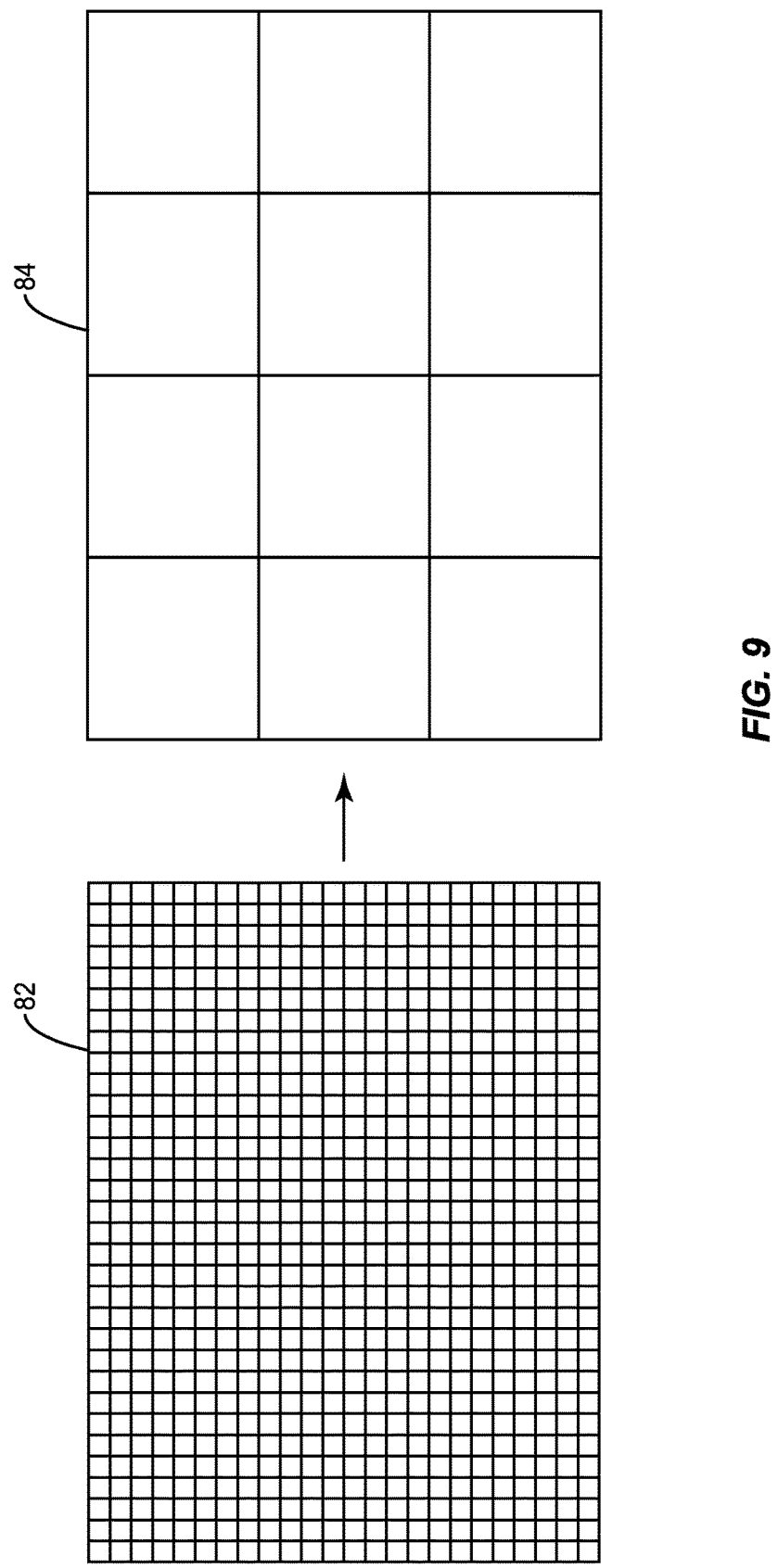
FIG. 9 illustrates the concepts involved in determining derived image data from image data according to one embodiment of the present disclosure.

FIG. 9 illustrates obtaining the derived image data from the image data according to one embodiment of the present disclosure. For exemplary purposes only, an image frame 82 is shown including 32×24 pixels. Each one of these pixels may be associated with multiple pieces of data, for example, the level of red, green, and blue colors detected for each pixel (which may each be 8 bits, or one byte). Further information such as light intensity may also be provided, which may add additional data (e.g., an additional byte) to each pixel. In contrast, a derived image data frame 84 is also shown. The derived image data frame 84 includes 4×3 zones, each of which is described by a single piece of information: mean light intensity, which may be represented by a single byte. Accordingly, while the image frame 82 may be associated with 32×24×4 pieces of data (e.g., bytes), the derived image data frame 84 is associated only with 4×3×1 pieces of data (e.g., bytes). As discussed above, this allows for significant reductions in computational overhead in the supplemental image data processing circuitry 48 and/or the control system 50.

Figure 10:
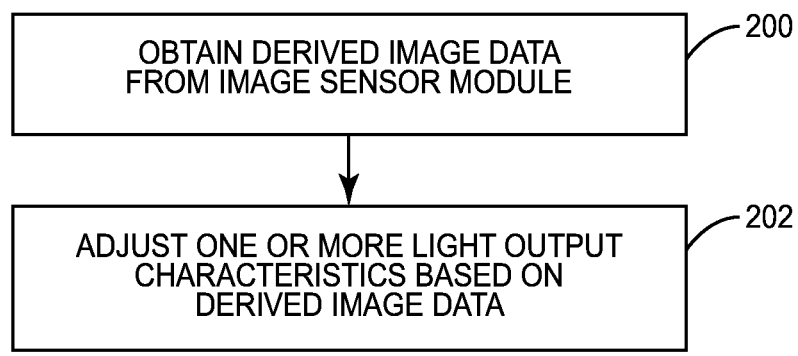
FIG. 10 is a flow diagram illustrating a method for adjusting one or more light output characteristics of a lighting fixture according to one embodiment of the present disclosure.

FIG. 10 is a flow diagram illustrating a method of adjusting the light output from the lighting fixture 10 according to one embodiment of the present disclosure. First, derived image data is obtained from the image sensor module 42 (step 200). As discussed above, this may be zoned mean light intensity data. One or more light output characteristics of the light output from the lighting fixture 10 (i.e., from the LED array 20) are then adjusted based on the derived image data (step 202). The light output characteristics may be adjusted by the control system 50. By using the derived image data to adjust one or more light output characteristics of the lighting fixture 10, the computational overhead associated with using image data in the lighting fixture 10 may be significantly reduced.

Figure 11:
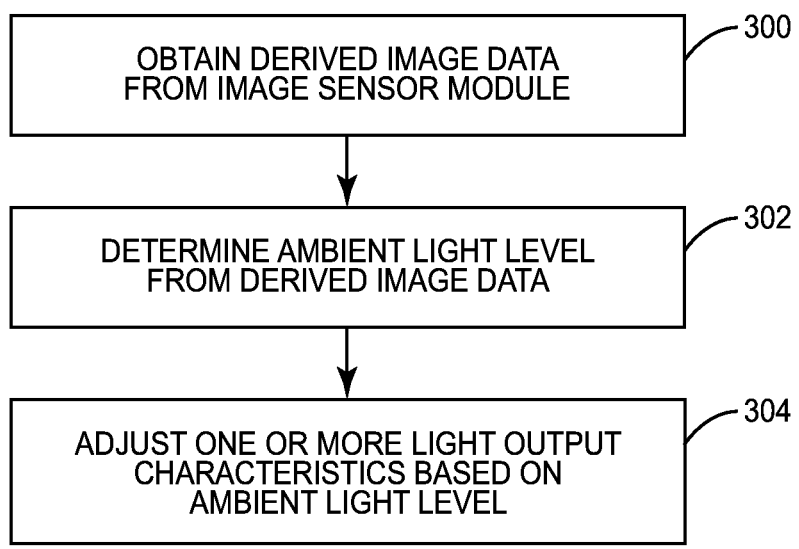
FIG. 11 is a flow diagram illustrating a method for adjusting one or more light output characteristics of a lighting fixture according to an additional embodiment of the present disclosure.

FIG. 11 is a flow diagram illustrating a method of adjusting the light output from the lighting fixture 10 according to an additional embodiment of the present disclosure. First, derived image data is obtained from the image sensor module 42 (step 300) as described above. An ambient light level is then determined from the derived image data (step 302). As discussed in detail below, determining an ambient light level from the derived image data may include averaging the zoned mean light intensity data for an image frame. In some embodiments, mean light intensity measurements for a particular zone that are greater than mean light intensity measurements for one or more other zones by a predetermined threshold may be discarded to increase the accuracy of the ambient light level. One or more light output characteristics of the lighting fixture 10 are then adjusted based on the ambient light level (step 304).

Figure 12:
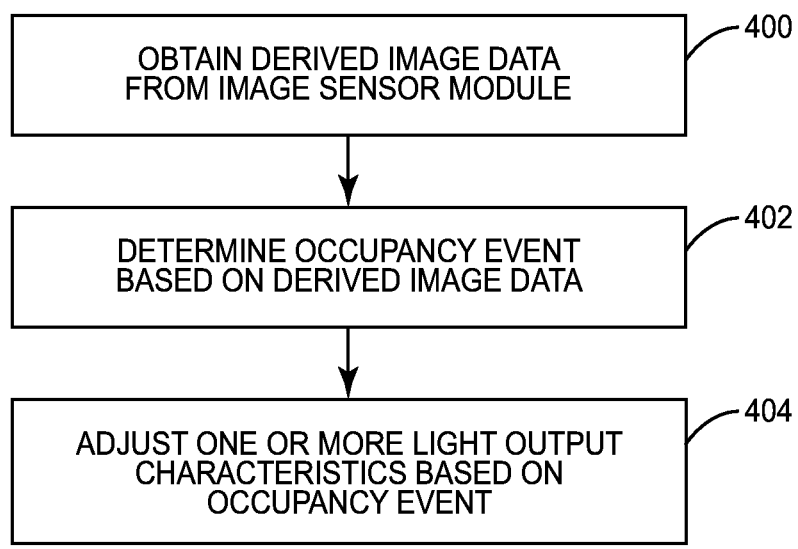
FIG. 12 is a flow diagram illustrating a method for adjusting one or more light output characteristics of a lighting fixture according to an additional embodiment of the present disclosure.

FIG. 12 is a flow diagram illustrating a method of adjusting the light output from the lighting fixture 10 according to an additional embodiment of the present disclosure. First, derived image data is obtained from the image sensor module 42 (step 400) as discussed above. An occupancy event is then determined based on the derived image data (step 402). As discussed in detail below, determining an occupancy event from the derived image data may include detecting changes between a running weighted average of mean light intensity for a particular zone and an instantaneous mean light intensity for that zone. Generally, if the difference is above a predetermined threshold, an occupancy event is indicated. In some embodiments, the difference may be normalized. In other embodiments, a Gaussian mixing model may be applied to the zoned mean light intensity data to detect relevant deviations from normal levels. One or more light output characteristics of the lighting fixture 10 are then adjusted based on the occupancy event (step 404).

Figure 13:
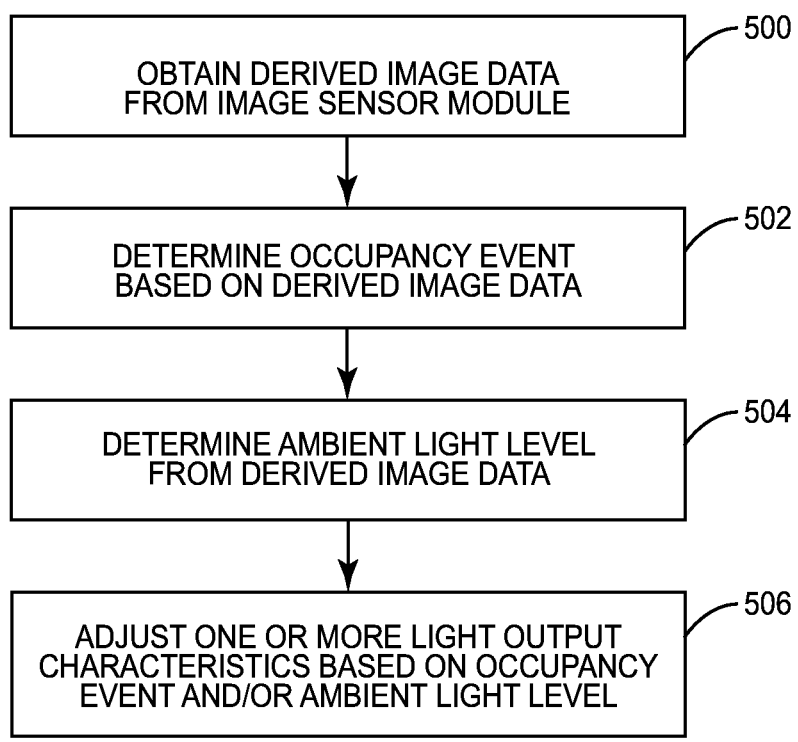
FIG. 13 is a flow diagram illustrating a method for adjusting one or more light output characteristics of a lighting fixture according to an additional embodiment of the present disclosure.

FIG. 13 is a flow diagram illustrating a method of adjusting the light output from the lighting fixture 10 according to an additional embodiment of the present disclosure. First, derived image data is obtained from the image sensor module 42 (step 500) as discussed above. An occupancy event is then determined based on the derived image data (step 502) as discussed above. Further, an ambient light level is determined based on the derived image data (step 504) as discussed above. One or more light output characteristics of the lighting fixture 10 are then adjusted based on the occupancy event and the ambient light level (step 506).

Figure 14:
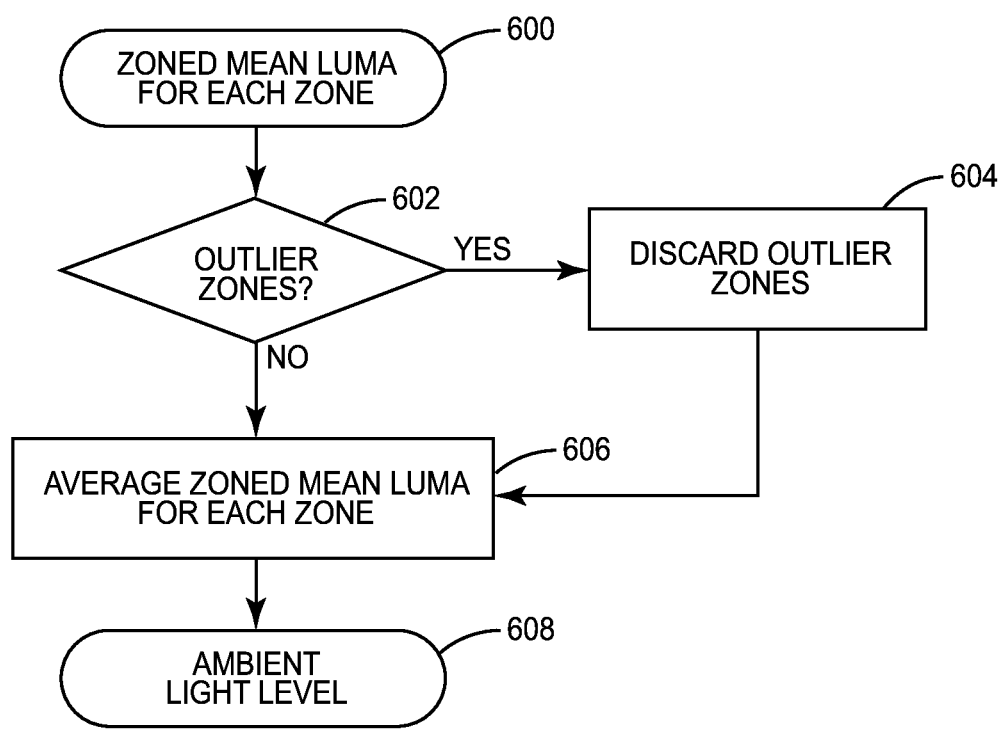
FIG. 14 is a flow diagram illustrating a method for determining an ambient light level from derived image data according to one embodiment of the present disclosure.

FIG. 14 is a flow diagram illustrating a method for determining an ambient light level from the derived image data according to one embodiment of the present disclosure. The method starts with the derived image data, which may be the mean light intensity for each zone in a frame (step 600). The mean light intensity for each zone is analyzed to determine if there are any outlier zones (step 602). An outlier zone may be a zone in a frame with a mean light intensity that is a predetermined threshold, for example, one or more standard deviations, above or below the mean light intensity for one or more other zones. These outlier zones may represent, for example, reflections off of a bright surface, a portion of a frame directed outside of a building, for example through a window, or the like. Accordingly, any outlier zones that are detected are discarded (step 604). The zoned mean light intensity values for the remaining zones are then averaged (step 606), the result being an ambient light level representative of the space captured by the frame (step 608).

Figure 15:
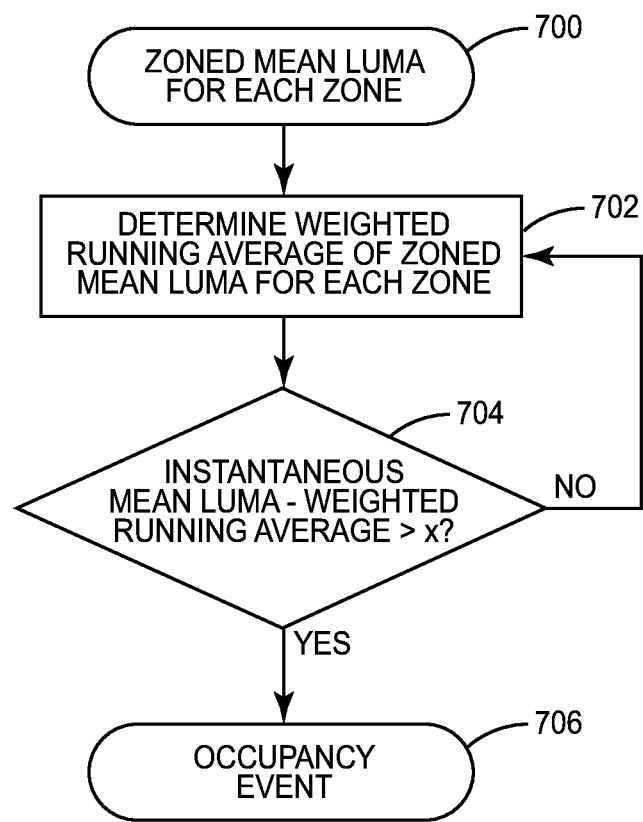
FIG. 15 is a flow diagram illustrating a method for determining an occupancy event from derived image data according to one embodiment of the present disclosure.

FIG. 15 is a flow diagram illustrating a method for determining an occupancy event from the derived image data according to one embodiment of the present disclosure.

The method starts with the derived image data, which may be the mean light intensity for each zone in a frame (step 700). The mean light intensity for each zone is kept as a weighted running average (step 702). The weight applied to the running average may be experimentally determined to balance the efficacy of the detection of occupancy events against the occurrence of false positives. The difference between an instantaneous mean light intensity for each zone and the weighted running average of the mean light intensity for each zone is then analyzed to determine if it is above a predetermined threshold (step 704). For example, the instantaneous mean light intensity for each zone and the weighted running average of the mean light intensity for each zone may be analyzed to determine if the instantaneous mean light intensity is one or more standard deviations from the weighted running average of the mean light intensity. If the difference between the instantaneous mean light intensity for a zone and the weighted running average of the mean light intensity for a zone is above the predetermined threshold, an occupancy event is indicated (step 706). If the difference between the instantaneous mean light intensity for a zone and the weighted running average of the mean light intensity for a zone is not above the predetermined threshold, an occupancy event is not indicated and the process continues to run.

Figure 16:
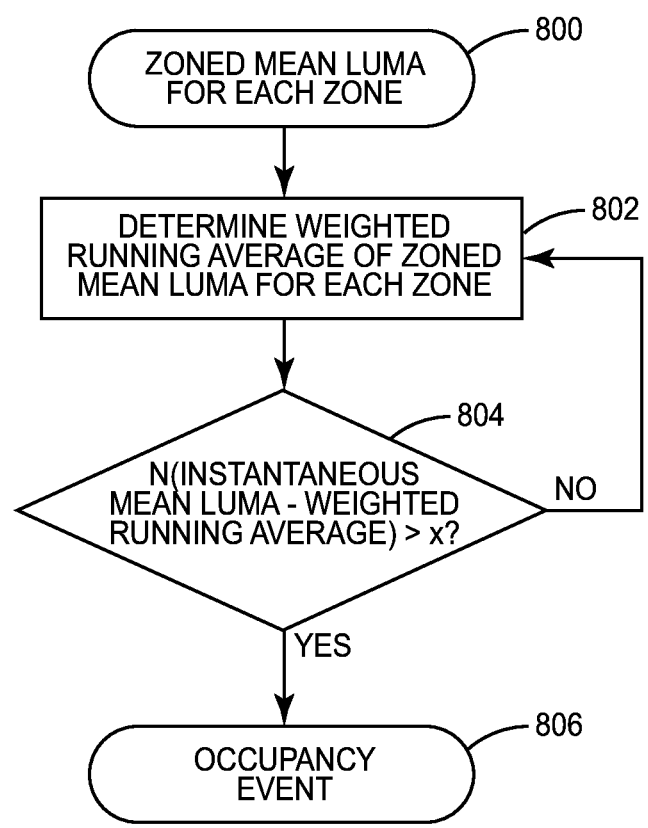
FIG. 16 is a flow diagram illustrating a method for determining an occupancy event from derived image data according to an additional embodiment of the present disclosure.

FIG. 16 is a flow diagram illustrating a method for determining an occupancy event from the derived image data according to an additional embodiment of the present disclosure. The method shown is similar to that of FIG. 15, with steps 800, 802, and 806 being the same as steps 700, 702, and 706. However, in step 804 the difference between the instantaneous mean light intensity for a zone and the weighted running average of the mean light intensity for the zone is normalized before being compared to the predetermined threshold (step 806). Normalizing the difference between the instantaneous mean light intensity for a zone and the weighted running average of the mean light intensity for the zone compensates for differences in ambient light levels that may make an occupancy event easier or harder to detect. For example, in low ambient light levels, the difference in mean light intensity of a zone with a person located therein versus an empty zone may be rather small when compared to high ambient light levels. Accordingly, a normalization function may be applied to the difference in order to increase the accuracy of occupancy event detection. The normalization function may be experimentally determined and fixed at runtime or continuously adjusted during operation.

As discussed above, the image sensor module 42 may be used to determine an ambient light level and one or more occupancy events in an area surrounding the lighting fixture 10. Conventionally, these functions would be performed by an analog ambient light sensor in combination with an analog passive infrared (PIR) occupancy sensor. The image sensor module 42 may be comparable in cost to these sensors. Further, the image sensor module 42 may allow for the implementation of additional functionality, such as the detection and location of additional lighting fixtures in a lighting fixture network, as discussed below.

Figure 17:
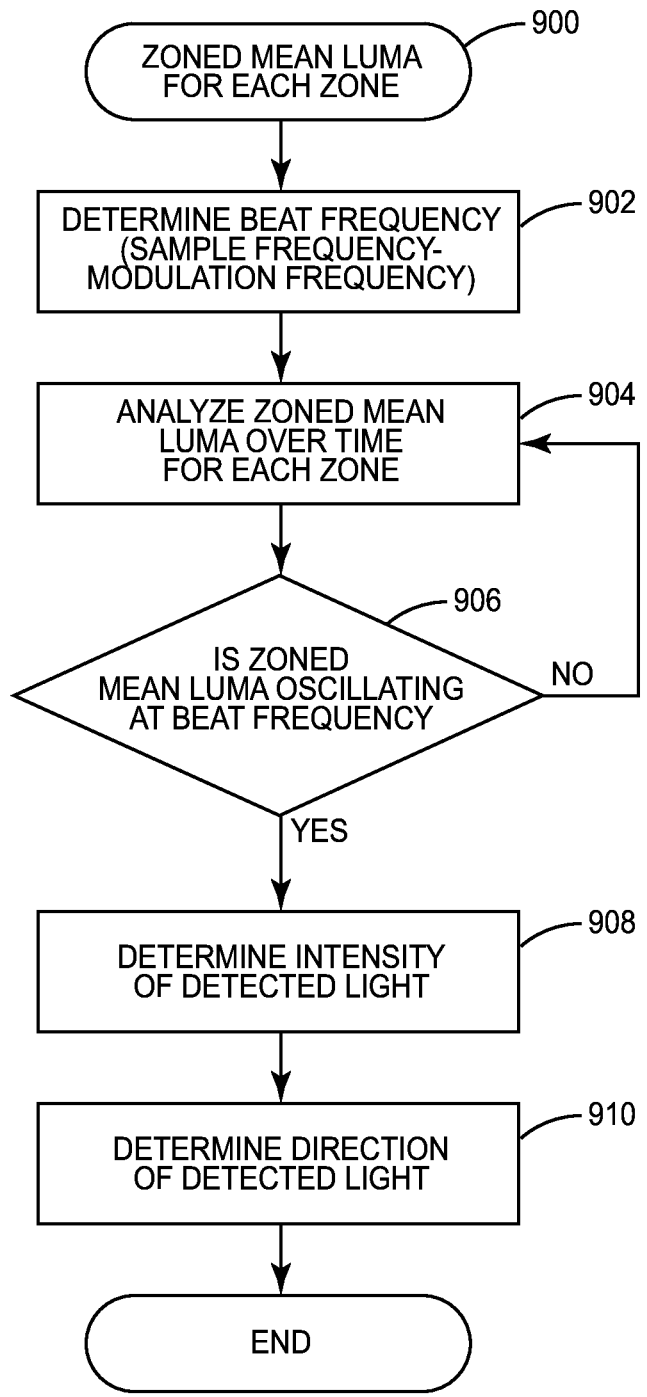
FIG. 17 is a flow diagram illustrating a method for detecting and characterizing a modulated light signal according to one embodiment of the present disclosure.

FIG. 17 is a flow diagram illustrating a method for detecting the presence of additional lighting fixtures in proximity to the lighting fixture 10 in a lighting fixture network. In particular, the described method involves detecting and characterizing a modulated light signal provided from an additional lighting fixture. As discussed in co-assigned U.S. patent application Ser. No. 13/782,022, now U.S. Pat. No. 9,155,165, the contents of which are hereby incorporated herein by reference in their entirety, lighting fixtures in a lighting system may take turns providing a modulated light signal, which is listened for by other lighting fixtures in the lighting network to determine the relative proximity of the lighting fixtures and thus whether they should be added to a control group from which the lighting fixtures may be controlled together. Generally, this involved the use of conventional analog ambient light sensors that were not capable of determining a direction from which the modulated light signal was provided. Instead, the analog ambient light sensors merely provided a rough indication of the proximity of the lighting fixtures to one another by either detecting or not detecting the modulated light signal, thereby indicating whether or not they should be provided in a control group together. Using the image sensor module 42, image processing may be used to more accurately ascertain whether or not lighting fixtures should be grouped together. Further, the image sensor module 42 is capable of providing direction information about a received modulated light signal, which may be used to determine a relative location of a broadcasting lighting fixture with respect to a receiving lighting fixture, as discussed below.

The method shown in FIG. 17 starts with the derived image data, which may be mean light intensity data for a number of zones in a frame (step 900). A beat frequency is determined based on the difference between a sample frequency of the derived image data and the modulation frequency of a light signal provided by another lighting fixture (step 902). The sample frequency of the derived image data may be limited by the frame rate of the image sensor 28. That is, the derived image data may only be updated at the frame rate of the image sensor 28. Because the sample frequency may be only marginally higher than the modulation frequency of a light signal provided by the additional lighting fixture, the beat frequency is used to detect the modulation. In particular, the mean light intensity for each zone is analyzed over time (step 904), and it is determined if the mean light intensity is oscillating at the beat frequency (step 906). For example, if the modulation frequency is 80 Hz, and the sample frequency of the image sensor 28 is 84 Hz, the mean light intensity for each zone will be analyzed to determine if it is oscillating at 4 Hz. If the mean light intensity for a particular zone is not oscillating at the beat frequency, the process continues to analyze the mean light intensity for each zone (step 904). If the mean light intensity for a particular zone is oscillating at the beat frequency, the intensity of light from the modulated light signal is determined (step 908), as discussed in detail below. Further, a direction of the modulated light signal is determined (step 910), as discussed in detail below, and the process ends.

Determining the intensity of light from the modulated light signal may be accomplished in a number of different ways. In one embodiment, once the modulation pattern is detected, the image sensor waits for the modulation to end and then determines a steady-state light output of the additional lighting fixture providing the modulated light signal, for example, using a mean light intensity value for the zone in which the modulated light signal was detected. In such a case, the additional lighting fixture may be configured to provide a solid-state light signal for a given period of time after providing the modulated light signal, while other lighting fixtures in the lighting network may remain off. In an additional embodiment, the average of the peak mean light intensity values in the sampling time for the modulated light signal is used as the light intensity. In an additional embodiment, the average of the mean light intensity values in the entire sampling time for the modulated light signal is used as the light intensity. The light intensity may be indicative of the proximity of the lighting fixture 10 to the additional lighting fixture providing the modulated light signal. Accordingly, the light intensity may be used to determine, for example, whether the additional lighting fixture should be included in a control group with the lighting fixture 10, or may be used to determine a location of the additional lighting fixture relative to the lighting fixture 10.

Determining a direction of the modulated light signal may be accomplished by determining the zone in which the intensity of the modulated light signal is highest, and tracing a line from a center of the frame through the zone. The line may then point in the general direction of the additional lighting fixture providing the modulated light signal.

Figure 18:
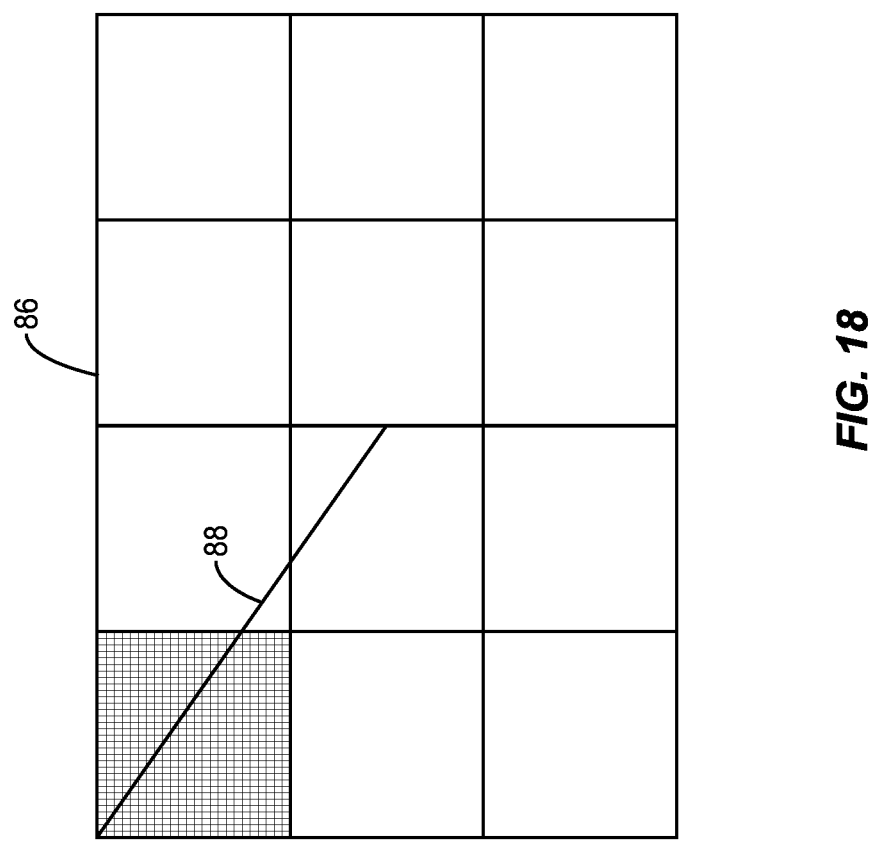
FIG. 18 illustrates a method for determining direction information of a modulated light signal according to one embodiment of the present disclosure.

FIG. 18 illustrates how the direction of a modulated light signal received from an additional lighting fixture may be determined according to one embodiment of the present disclosure. As shown, a modulated light signal is detected in the upper-left corner of a frame 86. A line 88 is traced from the center of the frame 86 through the zone in which the modulated light signal was detected, thereby indicating the general direction of the additional lighting fixture providing the modulated light signal. If the same modulated light signal were detected in one or more additional zones, the zones with the highest intensity of light from the modulated light signal would be used.

Figure 19:
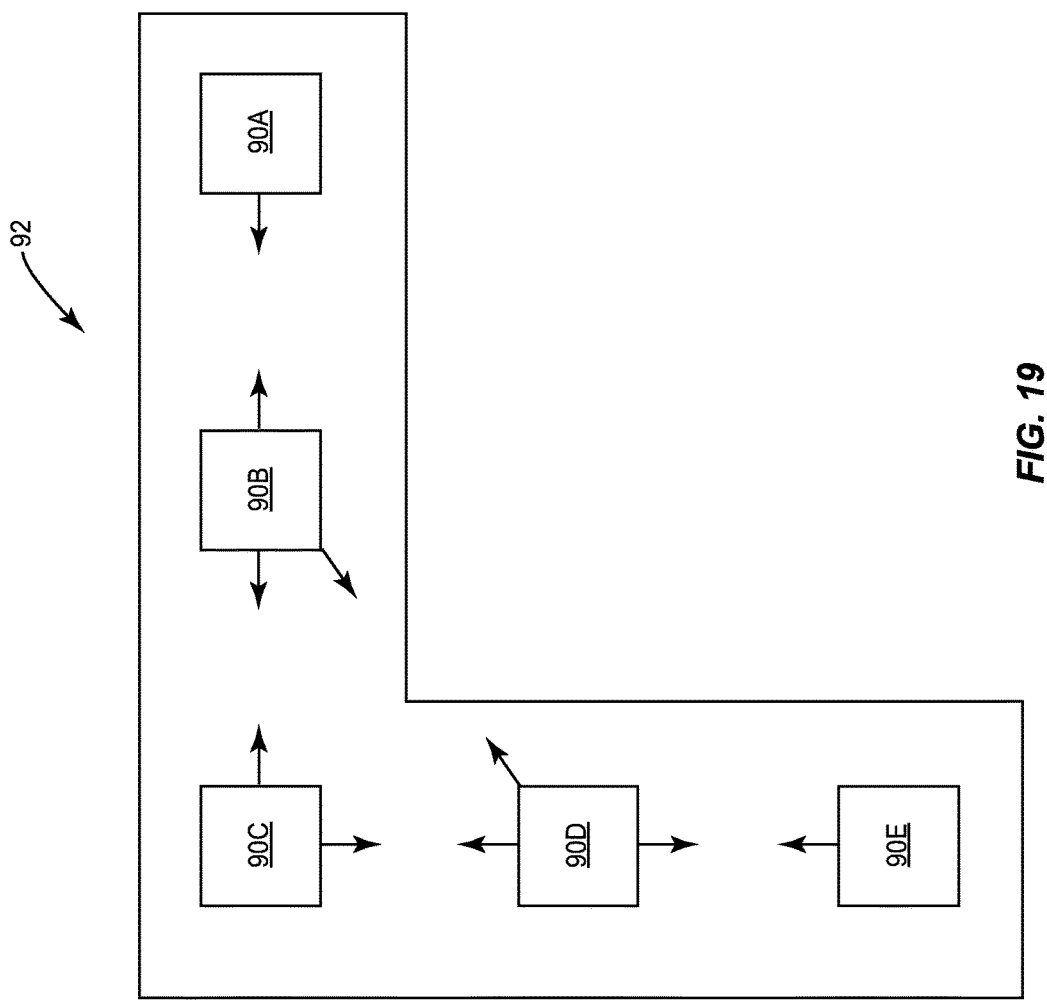
FIG. 19 illustrates a lighting system including the determined spatial relationship of each lighting fixture to the other according to one embodiment of the present disclosure.

FIG. 19 illustrates a map constructed by the various intensity and direction measurements obtained by a number of lighting fixtures 90 in a lighting system 92. As shown, each lighting fixture 90 has a relative direction and intensity, represented as a vector extending from one lighting fixture 90 towards another, for the nearby lighting fixtures 90. This information can be used to determine the relative location of the lighting fixtures 90 with respect to one another, and may be used to construct a graphical representation as shown in FIG. 19.

Figure 20:
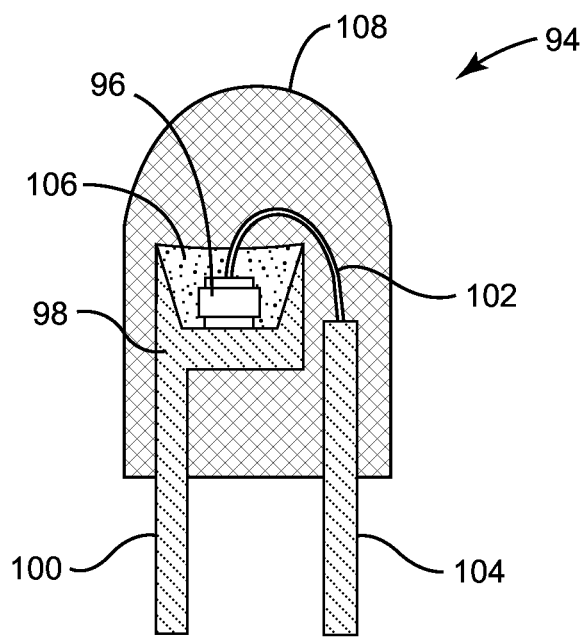
FIG. 20 is a cross-section of an exemplary LED according to a first embodiment of the disclosure.
Figure 21:
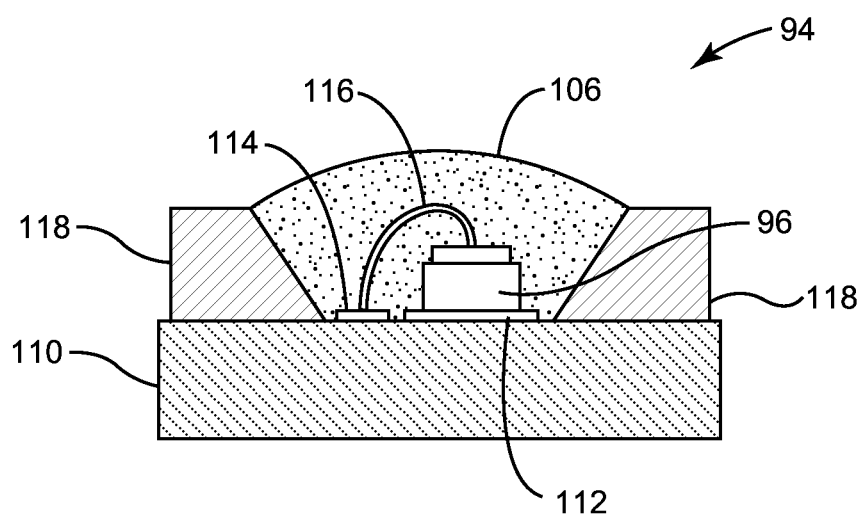
FIG. 21 is a cross-section of an exemplary LED according to a second embodiment of the disclosure.

As discussed above, the LED array 20 includes a plurality of LEDs, such as the LEDs 94 illustrated in FIG. 20 and FIG. 21. With reference to FIG. 20, a single LED chip 96 is mounted on a reflective cup 98 using solder or a conductive epoxy, such that ohmic contacts for the cathode (or anode) of the LED chip 96 are electrically coupled to the bottom of the reflective cup 98. The reflective cup 98 is either coupled to or integrally formed with a first lead 100 of the LED 94. One or more bond wires 102 connect ohmic contacts for the anode (or cathode) of the LED chip 96 to a second lead 104.

The reflective cup 98 may be filled with an encapsulant material 106 that encapsulates the LED chip 96. The encapsulant material 106 may be clear or contain a wavelength conversion material, such as a phosphor, which is described in greater detail below. The entire assembly is encapsulated in a clear protective resin 108, which may be molded in the shape of a lens to control the light emitted from the LED chip 96.

An alternative package for an LED 94 is illustrated in FIG. 21 wherein the LED chip 96 is mounted on a substrate 110. In particular, the ohmic contacts for the anode (or cathode) of the LED chip 96 are directly mounted to first contact pads 112 on the surface of the substrate 110. The ohmic contacts for the cathode (or anode) of the LED chip 96 are connected to second contact pads 114, which are also on the surface of the substrate 110, using bond wires 116. The LED chip 96 resides in a cavity of a reflector structure 118, which is formed from a reflective material and functions to reflect light emitted from the LED chip 96 through the opening formed by the reflector structure 118. The cavity formed by the reflector structure 118 may be filled with an encapsulant material 106 that encapsulates the LED chip 96. The encapsulant material 106 may be clear or contain a wavelength conversion material, such as a phosphor.

In either of the embodiments of FIG. 20 and FIG. 21, if the encapsulant material 106 is clear, the light emitted by the LED chip 96 passes through the encapsulant material 106 and the clear protective resin 108 without any substantial shift in color. As such, the light emitted from the LED chip 96 is effectively the light emitted from the LED 94. If the encapsulant material 106 contains a wavelength conversion material, substantially all or a portion of the light emitted by the LED chip 96 in a first wavelength range may be absorbed by the wavelength conversion material, which will responsively emit light in a second wavelength range. The concentration and type of wavelength conversion material will dictate how much of the light emitted by the LED chip 96 is absorbed by the wavelength conversion material as well as the extent of the wavelength conversion. In embodiments where some of the light emitted by the LED chip 96 passes through the wavelength conversion material without being absorbed, the light passing through the wavelength conversion material will mix with the light emitted by the wavelength conversion material. Thus, when a wavelength conversion material is used, the light emitted from the LED 94 is shifted in color from the actual light emitted from the LED chip 96.

For example, the LED array 20 may include a group of BSY or BSG LEDs 94 as well as a group of red LEDs 94. BSY LEDs 94 include an LED chip 96 that emits bluish light, and the wavelength conversion material is a yellow phosphor that absorbs the blue light and emits yellowish light. Even if some of the bluish light passes through the phosphor, the resultant mix of light emitted from the overall BSY LED 94 is yellowish light. The yellowish light emitted from a BSY LED 94 has a color point that falls above the Black Body Locus (BBL) on the 1976 CIE chromaticity diagram wherein the BBL corresponds to the various color temperatures of white light.

Similarly, BSG LEDs 94 include an LED chip 96 that emits bluish light; however, the wavelength conversion material is a greenish phosphor that absorbs the blue light and emits greenish light. Even if some of the bluish light passes through the phosphor, the resultant mix of light emitted from the overall BSG LED 94 is greenish light. The greenish light emitted from a BSG LED 94 has a color point that falls above the BBL on the 1976 CIE chromaticity diagram wherein the BBL corresponds to the various color temperatures of white light.

The red LEDs 94 generally emit reddish light at a color point on the opposite side of the BBL as the yellowish or greenish light of the BSY or BSG LEDs 94. As such, the reddish light from the red LEDs 94 may mix with the yellowish or greenish light emitted from the BSY or BSG LEDs 94 to generate white light that has a desired color temperature and falls within a desired proximity of the BBL. In effect, the reddish light from the red LEDs 94 pulls the yellowish or greenish light from the BSY or BSG LEDs 94 to a desired color point on or near the BBL. Notably, the red LEDs 94 may have LED chips 96 that natively emit reddish light wherein no wavelength conversion material is employed. Alternatively, the LED chips 96 may be associated with a wavelength conversion material, wherein the resultant light emitted from the wavelength conversion material and any light that is emitted from the LED chips 96 without being absorbed by the wavelength conversion material mixes to form then desired reddish light.

The blue LED chip 96 used to form either the BSY or BSG LEDs 94 may be formed from a gallium nitride (GaN), indium gallium nitride (InGaN), silicon carbide (SiC), zinc selenide (ZnSe), or like material system. The red LED chip 96 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 22:
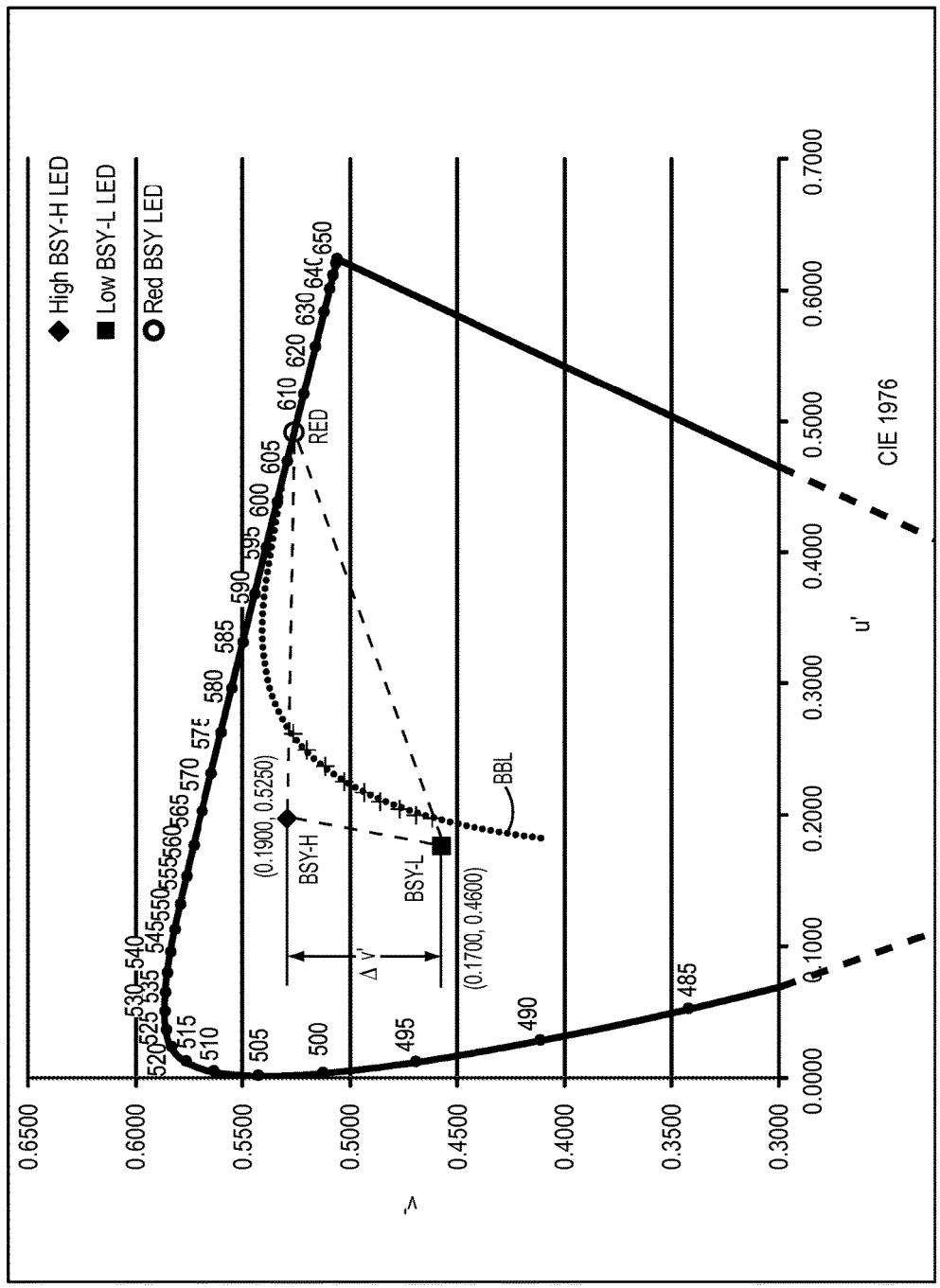
FIG. 22 is CIE 1976 chromaticity diagram that illustrates the color points for three different LEDs and a black body locus.

The International Commission on Illumination (Commission internationale de l'éclairage, or CIE) has defined various chromaticity diagrams over the years. The chromaticity diagrams are used to project a color space that represents all human perceivable colors without reference to brightness or luminance. FIG. 22 illustrates a CIE 1976 chromaticity diagram, which includes a portion of a Planckian locus, or black body locus (BBL). The BBL is a path within the color space that the color of an incandescent black body would travel as the temperature of the black body changes. While the color of the incandescent body may range from an orangish-red to blue, the middle portions of the path encompass what is traditionally considered as "white light."

Correlated Color Temperature (CCT), or color temperature, is used to characterize white light. CCT is measured in kelvin (K) and defined by the Illuminating Engineering Society of North America (IESNA) as "the absolute temperature of a blackbody whose chromaticity most nearly resembles that of the light source." Light output that is:

below 3200 K is a yellowish white and generally considered to be warm (white) light;

between 3200 K and 4000 K is generally considered neutral (white) light; and above 4000 K is bluish-white and generally considered to be cool (white) light.

In the following discussion, the focus is providing white light with a desired CCT, which is generally the primary goal for general illumination. However, the concepts discussed below equally apply to adjusting the overall color of the light provided by the lighting fixture 10 to colors that are not considered white or have color points that do not fall on or relatively close to the BBL.

The coordinates [u', v'] are used to define color points within the color space of the CIE 1976 chromaticity diagram. The v' value defines a vertical position and the u' value defines a horizontal position. As an example, the color points for a first BSY LED 94 is about (0.1900, 0.5250), a second BSY LED 94 is about (0.1700, 0.4600), and a red LED 94 is about (0.4900, 0.5600). Notably, the first BSY LED 94 and the second BSY LED 94 are significantly spaced apart from one another along the v' axis. As such, the first BSY LED 94 is much higher than the second BSY LED 94 in the chromaticity diagram. For ease of reference, the first BSY LED 94 is referenced as the high BSY-H LED, and the second BSY LED 94 is referenced as the low BSY-L LED.

As such, the Δv' for the high BSY-H LED and the low BSY-L LED is about 0.065 in the illustrated example. In different embodiments, the Δv' may be greater than 0.025, 0.030, 0.033, 0.040 0.050, 0.060, 0.075, 0.100, 0.110, and 0.120, respectively. Exemplary, but not absolute upper bounds for Δv' may be 0.150, 0.175, or 0.200 for any of the aforementioned lower bounds. For groups of LEDs of a particular color, the Δv' between two groups of LEDs is the difference between the average v' values for each group of LEDs. As such, the Δv' between groups of LEDs of a particular color may also be greater than 0.030, 0.033, 0.040 0.050, 0.060, 0.075, 0.100, 0.110, and 0.120, respectively, with the same upper bounds as described above. Further, the variation of color points among the LEDs 94 within a particular group of LEDs may be limited to within a seven, five, four, three, or two-step MacAdam ellipse in certain embodiments. In general, the greater the delta v', the larger the range through which the CCT of the white light can be adjusted along the black body locus. The closer the white light is to the black body locus, the more closely the white light will replicate that of an incandescent radiator.

In one embodiment, the LED array 20 includes a first LED group of only low BSY-L LEDs, a second LED group of only high BSY-H LEDs, and a third LED group of only red LEDs. The currents used to drive the first, second, and third LED groups may be independently controlled such that the intensity of the light output from the first, second, and third LED groups is independently controlled. As such, the light output for the first, second, and third LED groups may be blended or mixed to create a light output that has an overall color point virtually anywhere within a triangle formed by the color points of the respective low BSY-L LEDs, high BSY-H LEDs, and the red LEDs. Within this triangle resides a significant portion of the BBL, and as such, the overall color point of the light output may be dynamically adjusted to fall along the portion of the BBL that resides within the triangle (as well as virtually anywhere within the triangle).

A crosshatch pattern highlights the portion of the BBL that falls within the triangle. Adjusting the overall color point of the light output along the BBL corresponds to adjusting the CCT of the light output, which as noted above is considered white light when falling on or close to the BBL. In one embodiment, the CCT of the overall light output may be adjusted over a range from about 2700 K to about 5700 K. In another embodiment, the CCT of the overall light output may be adjusted over a range from about 3000 K to 5000 K. In yet another embodiment, the CCT of the overall light output may be adjusted over a range from about 2700 K to 5000 K. In yet another embodiment, the CCT of the overall light output may be adjusted over a range from about 3000 K to 4000 K. These variations in CCT can be accomplished while maintaining a high color rendering index value (CRI), such as a CRI equal to or greater than 90.

To be considered "white" light, the overall color point does not have to fall precisely on the BBL. Unless defined otherwise and for the purposes of this application only, a color point within a five-step MacAdam ellipse of the BBL is defined as white light on the BBL. For tighter tolerances, four, three, and two-step MacAdam ellipses may be defined.

As discussed in co-assigned and co-pending U.S. patent application Ser. No. 14/623,314, now U.S. Pat. No. 9,686,477, the contents of which are hereby incorporated herein in their entirety, the capture of images by the image sensor 28 may be coordinated with the light output of the LED array 20 in order to ensure that images are captured when the LED array 20 is providing adequate light to make the necessary measurements. In particular, the light output from the LED array 20 is usually pulse-width modulated at a frequency higher than the human eye can detect. Accordingly, the light output from the LED array 20 generally cycles between an on state and an off state at a relatively high frequency. If an image were captured during an off state of the LED array 20, there might not be adequate light to accurately detect occupancy events, and ambient light level measurements may similarly be skewed. Accordingly, the control system 50 may ensure that the operation of the LED array 20 and the image sensor 28 are coordinated.

Further, in some embodiments one or more light output characteristics of the LED array 20 may be changed during an image capture period, for example, to highlight one or more aspects of an image and thus better characterize a space. For example, a color temperature, a light intensity, a vividness, a color, or the like of the light output of the LED array 20 may be instantaneously changed during an image capture period. These changes may be done so briefly that the human eye is incapable of detecting them, thereby preventing any interruption in the perceptible light output from the LED array 20.

Those skilled in the art will recognize improvements and modifications to the embodiments of the present disclosure. All such improvements and modifications are considered within the scope of the concepts disclosed herein and the claims that follow.

What is claimed is:

1. A lighting fixture comprising:
   a light source;
   an image sensor module configured to capture image data and process the image data to provide derived image data, which is downsampled from the image data and comprises zoned mean light intensity data; and
   a control system coupled to the image sensor module and the light source and configured to:
   detect an occurrence of an occupancy event in an area surrounding the lighting fixture based on the derived image data, wherein detecting the occurrence of the occupancy event comprises:
   maintaining a running average of mean light intensity for each one of a plurality of zones in a frame; and
   determining if a difference between an instantaneous mean light intensity value for a particular one of the plurality of zones and the running average of mean light intensity for the particular one of the plurality of zones is above a predetermined threshold; and
   adjust one or more characteristics of light provided by the light source based on a determination of the occupancy event.

2. The lighting fixture of claim 1 wherein the running average of mean light intensity values is a weighted running average of mean light intensity values.

3. The lighting fixture of claim 1 wherein detecting the occurrence of the occupancy event further comprises determining if the difference between the instantaneous mean light intensity value and the running average for each one of a number of the plurality of zones is above the predetermined threshold.

4. The lighting fixture of claim 1 wherein detecting the occurrence of the occupancy event further comprises normalizing the difference between the instantaneous mean light intensity value for the particular one of the plurality of zones and the running average for the particular one of the plurality of zones.

5. The lighting fixture of claim 4 wherein detecting the occurrence of the occupancy event further comprises determining if the difference between the instantaneous mean light intensity value and the running average for each one of a number of the plurality of zones is above the predetermined threshold.

6. The lighting fixture of claim 1 wherein the light source is a light emitting diode (LED) light source.

7. The lighting fixture of claim 6 wherein the LED light source includes a plurality of LED strings, each comprising a plurality of LEDs coupled in series and configured to provide light with different characteristics such that the aggregate light output of the LED light source provides light with one or more desired characteristics.

8. The lighting fixture of claim 4 wherein the difference between the instantaneous mean light intensity value for the particular one of the plurality of zones and the running average for the particular one of the plurality of zones is normalized based on an ambient light level in the area surrounding the lighting fixture.

9. The lighting fixture of claim 1 wherein the derived image data is provided as part of an autoexposure process of the image sensor module.

* * * * *